United States Patent
Yeo

(10) Patent No.: US 8,554,177 B2
(45) Date of Patent: Oct. 8, 2013

(54) APPARATUS FOR UNLOCKING MOBILE DEVICE USING PATTERN RECOGNITION AND METHOD THEREOF

(75) Inventor: Hae-Dong Yeo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 474 days.

(21) Appl. No.: 12/328,016

(22) Filed: Dec. 4, 2008

(65) Prior Publication Data

US 2009/0149156 A1     Jun. 11, 2009

(30) Foreign Application Priority Data

Dec. 5, 2007 (KR) .................. 10-2007-0125669

(51) Int. Cl.
*H04M 1/66* (2006.01)

(52) U.S. Cl.
USPC .......... 455/411; 455/410; 340/5.54; 382/186; 726/17; 345/173

(58) Field of Classification Search
USPC ............... 455/410, 411; 340/5.54; 345/173; 382/186; 726/17
See application file for complete search history.

(56) References Cited

U.S. PATENT DOCUMENTS

| | | | | |
|---|---|---|---|---|
| 3,962,679 A | * | 6/1976 | Engelbrecht | 382/122 |
| 6,476,797 B1 | * | 11/2002 | Kurihara et al. | 345/173 |
| 6,707,942 B1 | * | 3/2004 | Cortopassi et al. | 382/186 |
| 2003/0095110 A1 | * | 5/2003 | Ukita et al. | 345/173 |
| 2003/0161099 A1 | * | 8/2003 | Aoki et al. | 361/683 |
| 2006/0012577 A1 | * | 1/2006 | Kyrola | 345/173 |
| 2006/0075250 A1 | * | 4/2006 | Liao | 713/182 |
| 2006/0283973 A1 | * | 12/2006 | Bean, Jr. | 239/70 |
| 2008/0295033 A1 | * | 11/2008 | Lee et al. | 715/840 |
| 2009/0085877 A1 | * | 4/2009 | Chang et al. | 345/173 |

FOREIGN PATENT DOCUMENTS

| | | |
|---|---|---|
| JP | 2005-159656 | 6/2005 |
| KR | 2000-0002147 | 1/2000 |
| KR | 10-2007-0024165 | 3/2007 |
| KR | 10-2007-0038643 | 4/2007 |

* cited by examiner

*Primary Examiner* — Kamran Afshar
*Assistant Examiner* — Marisol Fahnert
(74) *Attorney, Agent, or Firm* — Staas & Halsey LLP

(57) ABSTRACT

An apparatus and method for unlocking a mobile device using pattern recognition are provided. The apparatus includes a touch sensor unit sensing a predetermined pattern touch-input to a liquid crystal display (LCD) unit, a pattern recognition unit recognizing information about the input pattern sensed by the touch sensor unit, a pattern comparison unit comparing information about the input pattern recognized by the pattern recognition unit with information about a predetermined pattern set by a user, and a controller controlling supply of power to the LCD unit to enable the user to use the mobile device if the input pattern and the predetermined pattern are equal to each other as compared by the pattern comparison unit.

13 Claims, 3 Drawing Sheets

APPARATUS FOR UNLOCKING MOBILE DEVICE USING PATTERN RECOGNITION AND METHOD THEREOF

CROSS-REFERENCE TO RELATED APPLICATION

This application claims priority from Korean Patent Application No. 10-2007-0125669 filed on Dec. 5, 2007, in the Korean Intellectual Property Office, the disclosure of which is incorporated herein by reference in its entirety.

BACKGROUND OF THE INVENTION

1. Field of the Invention

The present invention relates to a mobile device, and, more particularly, to an apparatus for and a method of unlocking a touch-input mobile device by embodying an unlocking function using pattern recognition, thereby increasing user convenience and ensuring security improvement.

2. Description of the Related Art

Mobile devices such as mobile phones are used daily by many people, and a wide variety of private information is stored in them.

In particular, since private information, including phone numbers, data related to credit card payment, data related to stock transaction, requires a greater degree of security is stored in the mobile device, it has become an important issue to restrict a third party from accessing the private information using a locking function of a mobile device.

FIG. 1 is a flowchart illustrating a method of unlocking a conventional mobile device.

As shown in FIG. 1, in a conventional mobile device having a locking function set thereto (S101), when a numeric password is input through a keypad (S102), it is checked whether the input numeric password is identical with a numeric password preset by a user (S103). If the input numeric password is identical with the preset numeric password, the locking function set in the mobile device is canceled to allow the user to use the device (S104).

However, prior to use of the mobile device, due to the inconvenience having to enter passwords, users tend to be reluctant to use a locking function of the mobile device.

In recent years, there has been a gradually increasing demand for a large display in mobile devices. Further, a considerable amount of power consumed in such a mobile device is attributable to power consumption by the LCD unit. Accordingly, it is desirable to block power applied to the LCD unit when the mobile device is not used.

A power supply control switch or a touch sensor has conventionally been used to control power applied to an LCD unit of a mobile device.

However, in a mobile device that is usually put in a pocket or bag while it is not in use, the power applied to the LCD unit is controlled by means of a separate control switch or by a keypad for simple touch input, the control switch or keypad is likely to be inadvertently pressed, resulting in unnecessary power consumption.

SUMMARY OF THE INVENTION

The present invention provides an apparatus for unlocking a mobile device using pattern recognition, which can increase user convenience and ensure security improvement by embodying an unlocking function using pattern recognition in a mobile device based on a touch input mechanism.

The present invention also provides an apparatus for unlocking a mobile device using pattern recognition, which can prevent unnecessary power consumption by interrupting power supplied to an LCD when the mobile device is not used.

The present invention also provides a mobile device having the unlocking apparatus.

The present invention also provides a method of unlocking a mobile device using pattern recognition according to an embodiment of the present invention.

The above and other objects of the present invention will be described in or be apparent from the following description of the preferred embodiments.

According to an aspect of the present invention, there is provided an apparatus for unlocking a mobile device using pattern recognition, the apparatus including a touch sensor unit sensing a predetermined pattern touch-input to a liquid crystal display (LCD) unit, a pattern recognition unit recognizing information about the input pattern sensed by the touch sensor unit, a pattern comparison unit comparing information about the input pattern recognized by the pattern recognition unit with information about a predetermined pattern set by a user, and a controller controlling power supply to the LCD unit to enable the user to use the mobile device if the input pattern and the predetermined pattern are equal to each other as compared by the pattern comparison unit.

According to another aspect of the present invention, there is provided a method of unlocking a mobile device using pattern recognition, the method including sensing a predetermined pattern touch-input to a liquid crystal display (LCD) unit, recognizing information about the input pattern, comparing the recognized information about the input pattern with information about a predetermined pattern set by a user to determine whether the input pattern and the predetermined pattern are equal to each other, and, if the input pattern and the predetermined pattern are equal to each other, applying power to the LCD unit to enable the user to use the mobile device.

BRIEF DESCRIPTION OF THE DRAWINGS

The above and other features and advantages of the present invention will become apparent by describing in detail preferred embodiments thereof with reference to the attached drawings in which.

DETAILED DESCRIPTION OF THE INVENTION

Figure 1:
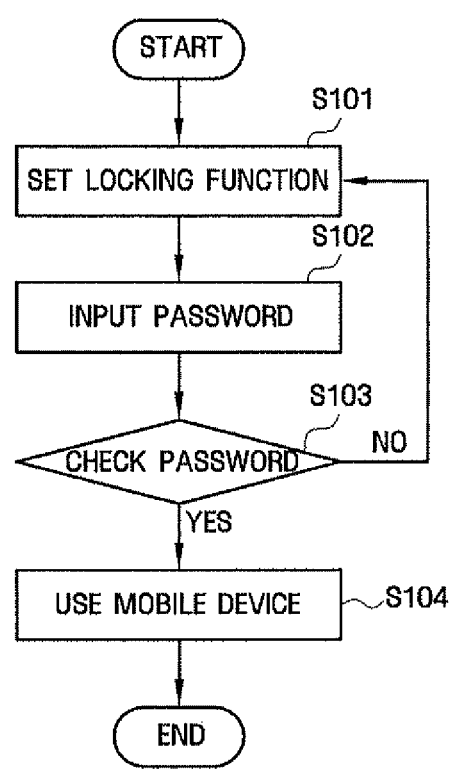
FIG. 1 is a flowchart illustrating a method of unlocking a conventional mobile device.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

An apparatus for and a method of unlocking a mobile device using pattern recognition according to the present invention now will be described more fully hereinafter with reference to the accompanying drawings, in which preferred embodiments of the inventions are shown, and well known materials or methods are not described in detail so as not to unnecessarily obscure aspects of the present invention.

Figure 2:
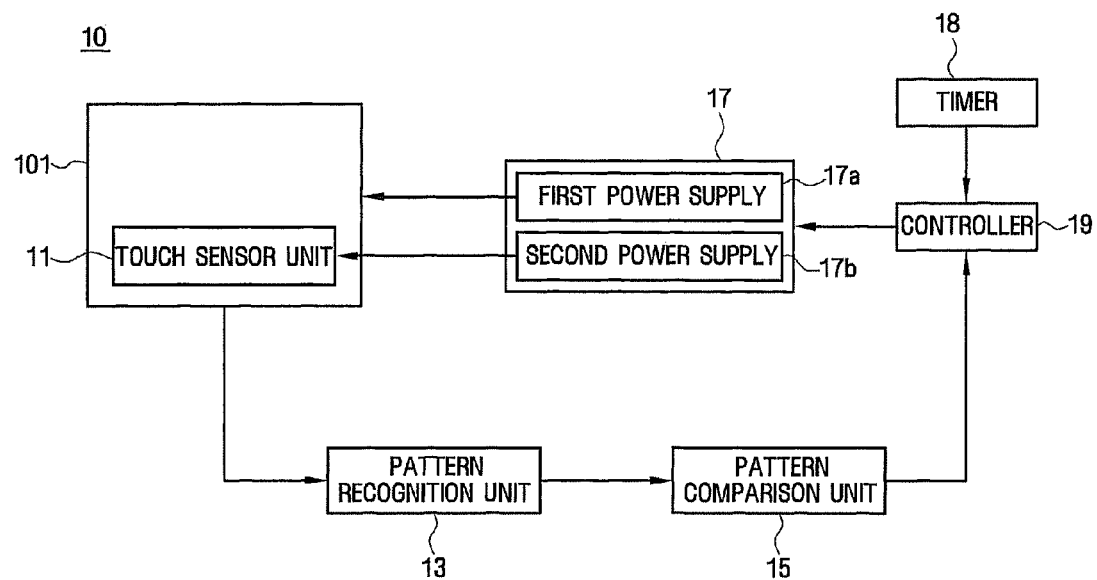
FIG. 2 is a block diagram of an apparatus for unlocking a mobile device using pattern recognition according to an embodiment of the present invention.

FIG. 2 is a block diagram of an apparatus for unlocking a mobile device using pattern recognition according to an embodiment of the present invention.

As shown in FIG. 2, the unlocking apparatus 10 includes a touch sensor unit 11, a pattern recognition unit 13, a pattern comparison unit 15, a power supply unit 17, and a controller 19.

The touch sensor unit 11 is provided in a liquid crystal display (LCD) unit 101 of a mobile device (100 of FIG. 3), and senses a predetermined pattern (P of FIG. 3) touch-input to the LCD unit 101. The touch sensor unit 11 is also capable of sensing patterns multi-touch input through the LCD unit 101. Here, examples of the mobile device 100 may include many types of electronic devices supporting touch input, e.g., smart phones, MP3 players, PMP, or the like.

The pattern recognition unit 13 recognizes information about the input pattern sensed by the touch sensor unit 11.

The pattern recognition unit 13 recognizes shapes of the input pattern P on the coordinate system of the LCD unit 101 based on input pattern data, including a start point, an end point, an inflection point, and so on.

In addition, the pattern recognition unit 13 recognizes the input pattern in various manners in response to the shape, the duration of time or the strength of pattern drawn on the LCD unit 101.

The pattern comparison unit 15 compares information about the input pattern P recognized by the pattern recognition unit 10 with information about a predetermined pattern set by a user. The pattern comparison unit 15 compares the input pattern P with the predetermined pattern, in view of data including the shape of the pattern, the duration of time or strength of the pattern, for example.

The power supply unit 17 independently supplies power to the LCD unit 101 and the touch sensor unit 11.

Specifically, the power supply unit 17 includes a first power supply 17a supplying power necessary for operating a backlight (not shown) provided in the LCD unit 101, and a second power supply 17b separated from the first power supply 17a and supplying power necessary for operating the touch sensor unit 11.

The controller 19 controls the first power supply 17a to the LCD unit 101 to enable the user to use the mobile device 100 if the input pattern P and the predetermined pattern are the same as determined by the pattern comparison unit 15.

The controller 19 controls the second power supply 17b to supply power to the touch sensor unit 11 when a power button of the mobile device 100 is actuated.

In addition, the controller 19 blocks power from being supplied to the LCD unit 101 when the mobile device 100 is not manipulated for a predefined period of time set by the user. Here, a timer 18 is provided for checking the predefined period of time set by the user and transmitting a signal indicating the result of the check to the controller.

Hereinafter, a method of unlocking a mobile device using pattern recognition according to an embodiment of the present invention will be described in detail with reference to FIGS. 3 and 4

Figure 3:
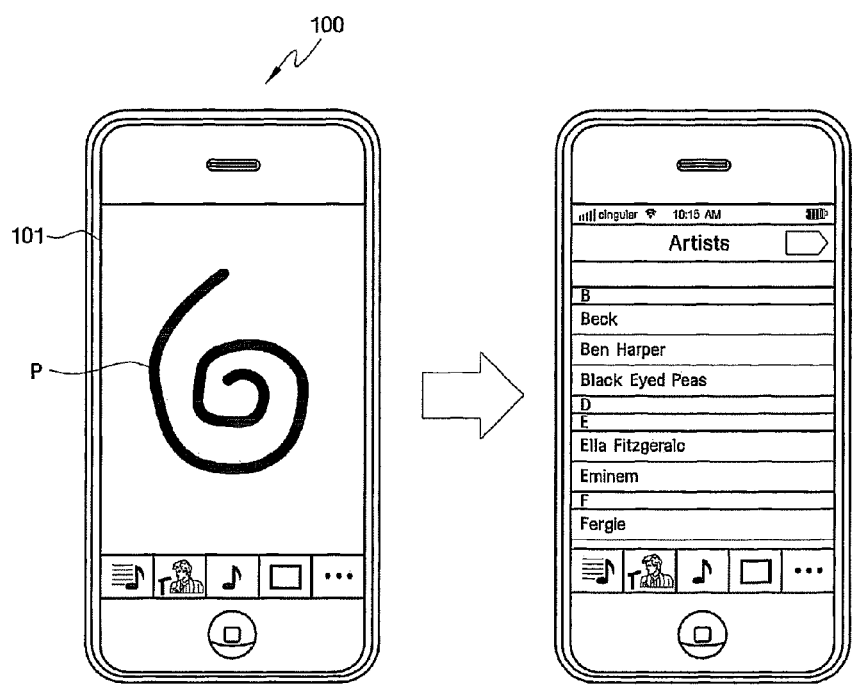
FIG. 3 is a diagram illustrating an exemplary state in which a mobile device is usable upon activation of power supply to an LCD by inputting of a predetermined pattern in a mobile device having an unlocking apparatus using pattern recognition according to an embodiment of the present invention.
Figure 4:
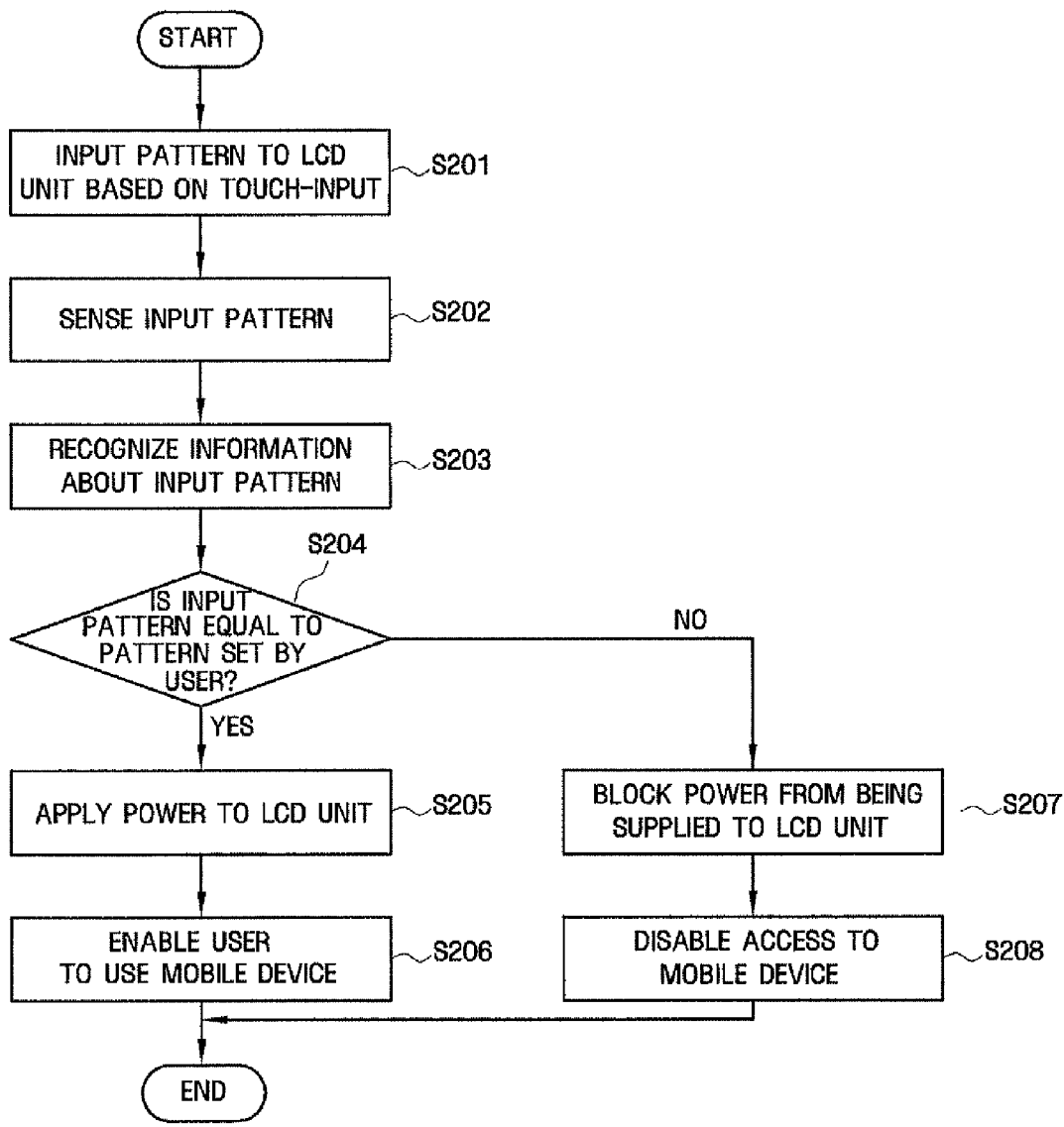
FIG. 4 is a flowchart illustrating a method of unlocking a mobile device using pattern recognition according to an embodiment of the present invention.

FIG. 3 is a diagram illustrating an exemplary state in which a mobile device is usable upon activation of power supply to an LCD by inputting of a predetermined pattern in a mobile device having an unlocking apparatus using pattern recognition according to an embodiment of the present invention, and FIG. 4 is a flowchart illustrating a method of unlocking a mobile device using pattern recognition according to an embodiment of the present invention.

As shown in FIGS. 3 and 4, according to the present invention, power is blocked from being supplied to the LCD unit 101, thereby preventing unnecessary power consumption when the mobile device 100 is not manipulated for a predefined period of time set by the user.

When a user intends to use the mobile device 100, the user inputs a predetermined pattern P to the LCD unit 101 based on a touch-input method (S201). Here, the predetermined pattern P can be touch-input to the LCD unit 101 in various manners in response to the shape of the input pattern P, the period of time during which the input pattern P is drawn on the LCD unit 101, and the strength of pressure with which the input pattern P is drawn on the LCD unit 101. Although not shown in the drawing, in the case where the input pattern P is drawn, for example, in a linear shape, the input pattern P can be drawn with a longer period of time or a stronger pressure at the midway point in the linear shape. The input pattern P can be used in practical applications of individual's signature.

The touch-input pattern P is sensed (S202). Information about the input pattern P is recognized (S203). That is, the input pattern P is recognized in various manners in response to the shape of the input pattern P, the period of time during which the input pattern P is drawn on the LCD unit 101, and the strength of pressure with which the input pattern P is drawn on the LCD unit 101. Here, the touch sensor unit (11 of FIG. 2) is independently supplied with power from the LCD unit 101. That is, when a power button of the mobile device 100 is actuated, the LCD unit 101 is supplied with power from the second power supply (17b of FIG. 2), which is separately provided from the first power supply (17a of FIG. 2). Accordingly, even when power is not supplied to the LCD unit 101, the touch sensor unit 11 can perform a sensing operation.

Next, information about the input pattern P is compared with information about a predetermined pattern set by the user (S204). That is, the pattern comparison unit 15 compares the input pattern P with the predetermined pattern set by the user to determine whether the input pattern P and the predetermined pattern are equal to each other, in view of the shape of pattern, the period of time, and the strength of pressure.

If the input pattern P and the predetermined pattern are equal to each other, power from the first power supply 17a is supplied to a backlight of the LCD unit 101 (S205) to make the application operable, thereby enabling the user to use the mobile device 100 (S206). In contrast, if the input pattern P and the predetermined pattern are not equal to each other, power from the first power supply 17a is not applied to the LCD unit 101 (S207), thereby disabling the user to use the mobile device 100 (S208).

That is, if a user touch-inputs to the LCD unit 101 a pattern equal to a predetermined pattern set to the mobile device 100, the mobile device 100 is unlocked such that power is applied to the LCD unit 101 of the mobile device 100 to allow only an authorized user to use the mobile device 100, thereby protecting private information stored in the mobile device 100.

Therefore, according to the present invention, when the mobile device 100 is not used by the user, the power applied to the LCD unit 101 is interrupted, thereby preventing unnecessary power consumption. In addition, since only the authorized user is allowed to use the mobile device 100 using pattern recognition, improved security can be achieved without cumbersome manipulation of numeric password inputs, unlike in the prior art.

As described above, the apparatus and method for unlocking a mobile device using pattern recognition according to the present invention provide at least the following advantages.

First, an unlocking function is embodied using pattern recognition in a touch-input mobile device, thereby increasing user convenience and ensuring security improvement.

Second, when the mobile device is not used by the user, the power applied to an LCD unit is interrupted, thereby preventing unnecessary power consumption.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for unlocking a mobile device using pattern recognition, comprising:
    a touch sensor unit to sense a pattern touch-input to a liquid crystal display (LCD) unit;
    a pattern recognition unit to analyze information about the input pattern sensed by the one touch sensor unit;
    a pattern comparison unit to compare information about the input pattern analyzed by the pattern recognition unit with information about a predetermined pattern stored in a memory;
    a controller to control the mobile device to unlock the mobile device to enable a user to use the mobile device if the input pattern and the predetermined pattern are equal to each other as compared by the pattern comparison unit, and to supply power for operating the LCD unit after unlocking the mobile device;
    a power supply unit to supply a power necessary for operating the mobile device,
    wherein the power supply unit comprises a first power supply unit, and a second power supply unit separately, the first power supply unit is for supplying power necessary for operating the LCD unit of the mobile device and the second power supply unit is for supplying power necessary for operating the touch sensor unit of the mobile device while locking the mobile device, and
    wherein the LCD unit and the touch sensor unit are independently supplied with power from the power supply unit.

2. The apparatus of claim 1, wherein the touch sensor unit senses the predetermined pattern multi-touch input to the LCD unit.

3. The apparatus of claim 1, wherein the pattern recognition unit analyzes the pattern in various manners in response to the shape of pattern which is drawn on the LCD unit.

4. The apparatus of claim 1, wherein the pattern recognition unit analyzes the pattern in various manners in response to the duration of time during which the pattern is drawn on the LCD unit.

5. The apparatus of claim 1, wherein the pattern recognition unit analyzes the pattern in various manners in response to the strength with which the pattern is drawn on the LCD unit.

6. The apparatus of claim 1, wherein the controller blocks power from being supplied to the LCD unit whenever the mobile device is not manipulated for a predefined period of time set by the user.

7. A mobile device including the unlocking apparatus of any one of claims 1 through 6.

8. A method of unlocking a mobile device using pattern recognition, comprising:
    supplying a power necessary for operating the mobile device;
    sensing a pattern touch-input to a liquid crystal display (LCD) unit using a touch sensor unit;
    analyzing information about the input pattern;
    comparing the analyzed information about the input pattern with information about a predetermined pattern stored in a memory to determine whether the input pattern and the predetermined pattern are equal to each other;
    if the input pattern and the predetermined pattern are equal to each other, unlocking the mobile device to enable a user to use the mobile device, and supplying power for operating the LCD unit after unlocking the mobile device,
    wherein the power is supplied by a first power supply unit and a second power supply unit separately, the first power supply unit is for supplying power necessary for operating the LCD unit of the mobile device and the second power supply unit is for supplying power necessary for operating the touch sensor unit of the mobile device while locking the mobile device, and
    wherein the LCD unit and the touch sensor unit are independently supplied with power.

9. The method of claim 8, wherein the analyzing of the input pattern comprises analyzing the input pattern in various manners in response to the shape of pattern which is drawn on the LCD unit.

10. The method of claim 8, wherein the analyzing of the input pattern comprises analyzing the input pattern in various manners in response to the duration of time during which the pattern is drawn on the LCD unit.

11. The method of claim 8, wherein the analyzing of the input pattern comprises analyzing the input pattern in various manners in response to the strength with which the pattern is drawn on the LCD unit.

12. The method of claim 8, further comprising blocking power from being supplied to the LCD unit whenever the mobile device is not manipulated for a predefined period of time set by the user.

13. The method of claim 8, wherein the touch sensor unit senses the predetermined pattern multi-touch input to the LCD unit.

* * * * *